July 5, 1955 T. I. MILLEN 2,712,244
TRANSMISSION OPERATING MECHANISM
Filed Dec. 29, 1953 7 Sheets-Sheet 1

INVENTOR
T. I. MILLEN
BY
Maybee & Legris
ATTORNEYS.

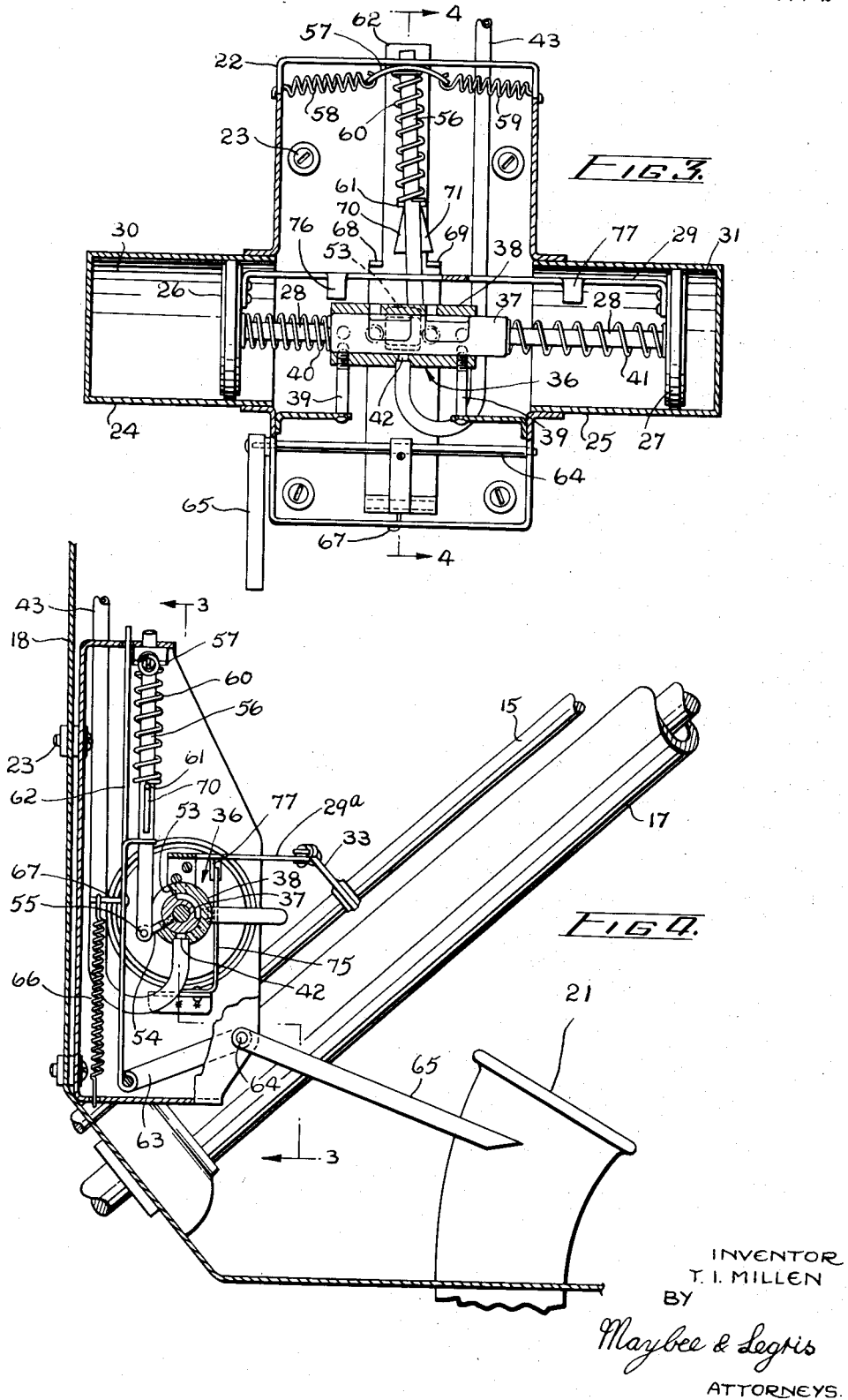

July 5, 1955

T. I. MILLEN 2,712,244

TRANSMISSION OPERATING MECHANISM

Filed Dec. 29, 1953

INVENTOR
T. I. MILLEN

BY

*Maybee & Legris*

ATTORNEYS.

July 5, 1955  T. I. MILLEN  2,712,244

TRANSMISSION OPERATING MECHANISM

Filed Dec. 29, 1953  7 Sheets-Sheet 4

INVENTOR
T. I. MILLEN
BY
Maybee & Legris.
ATTORNEYS.

July 5, 1955

T. I. MILLEN 2,712,244

TRANSMISSION OPERATING MECHANISM

Filed Dec. 29, 1953

INVENTOR
T. I. MILLEN

BY

Maybee & Legris

ATTORNEYS.

July 5, 1955 — T. I. MILLEN — 2,712,244
TRANSMISSION OPERATING MECHANISM
Filed Dec. 29, 1953 — 7 Sheets-Sheet 6
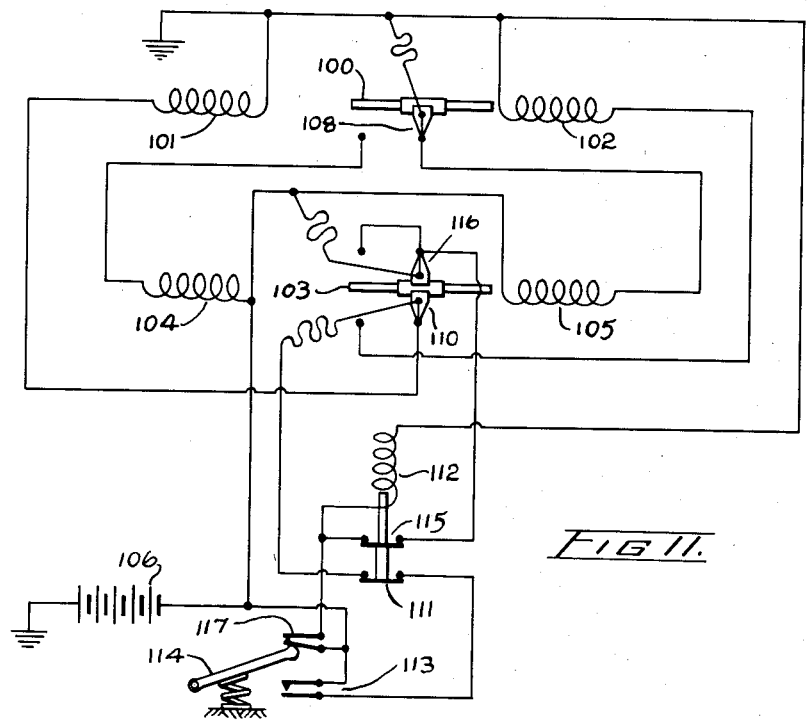
FIG. 11.
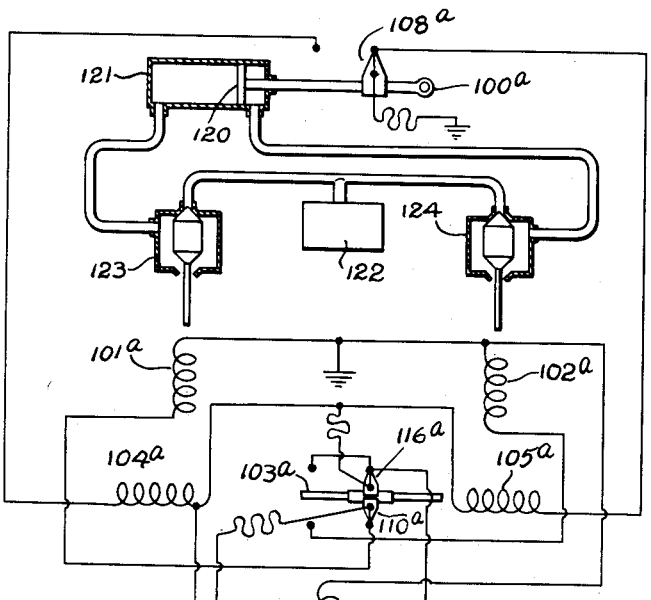
FIG. 12.
INVENTOR
T. I. MILLEN
BY
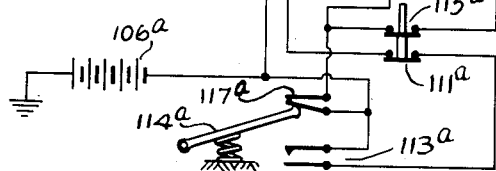
Maybee & Legris
ATTORNEYS.

July 5, 1955

T. I. MILLEN 2,712,244

TRANSMISSION OPERATING MECHANISM

Filed Dec. 29, 1953

INVENTOR
T. I. MILLEN
BY
Maybee & Legris
ATTORNEYS.

United States Patent Office 2,712,244
Patented July 5, 1955

2,712,244

TRANSMISSION OPERATING MECHANISM

Theodore I. Millen, Toronto, Ontario, Canada

Application December 29, 1953, Serial No. 400,911

30 Claims. (Cl. 74—334)

The invention relates to an apparatus for effecting a controlled oscillatory movement between two positions of a device to which the said apparatus is coupled. There are many possible applications for an apparatus of this kind, but since the invention has been developed for use with automotive vehicle transmissions, it will be described particularly with reference to that application.

One of the objects of the invention is to provide, for an automotive vehicle including a conventional transmission and a clutch, a simple apparatus for operating the transmission, the apparatus being so constructed and arranged that all the settings of the transmission may be effected by manual operation if the operator so desires, and the second and high gear settings of the transmission may be effected by power means activated by depression of the clutch pedal if the driver so elects.

Another object of the invention is to provide an automatic apparatus which is adapted to be combined with a conventional clutch and transmission, and to form therewith an automatic transmission.

A further object of the invention is to provide an apparatus for effecting a controlled oscillatory movement between two positions of a device to which the apparatus may be connected, the said apparatus having a power operated motor member which when activated by an operator moves from the position at which it was at rest to the alternative position and automatically comes to a stop, without recycling, and returns to its original position only if it is re-activated by the operator. An additional object of the invention is to provide an apparatus of this kind which is so constructed and arranged that the device to which the apparatus is connected may manually be moved by the operator while the apparatus remains connected to it, without the apparatus causing any appreciable resistance to movement of the device.

All of the features which are believed to be characteristic of the invention are set forth with particularity in the appended claims. The invention itself, however, both as to its organization and manner of construction, together with further objects and advantages thereof, may best be understood by reference to the following description, taken in connection with the accompanying drawings, in which like reference characters indicate corresponding parts in Figs. 1–10, and in which analogous reference characters indicate similar or equivalent parts in Figs. 11–14.

Fig. 1 is a perspective view of a pneumatically operated automotive vehicle transmission operating apparatus constructed in accordance with the invention, and shown installed in a typical automobile of the kind having a manually operated transmission operating handle extending adjacent the steering column, the parts of the apparatus being shown at the position which they assume when the transmission has been set at "high" and the clutch is in engagement;

Fig. 3 is a vertical cross-sectional view of the said pneumatic apparatus, taken through the line 3—3 of Fig. 4, with the parts shown in the same position as in Fig. 1;

Fig. 4 is a vertical cross-sectional view of the apparatus taken through the line 4—4 of Fig. 3, with the parts shown in the same position as in Figs. 1 and 3;

Fig. 11 is a schematic illustration of an electrically operated embodiment of the invention having a double acting selector;

Fig. 12 is a schematic illustration of a pneumo-electrical embodiment of the invention, the electrical components of which are based on the apparatus of Fig. 11;

Figure 1:
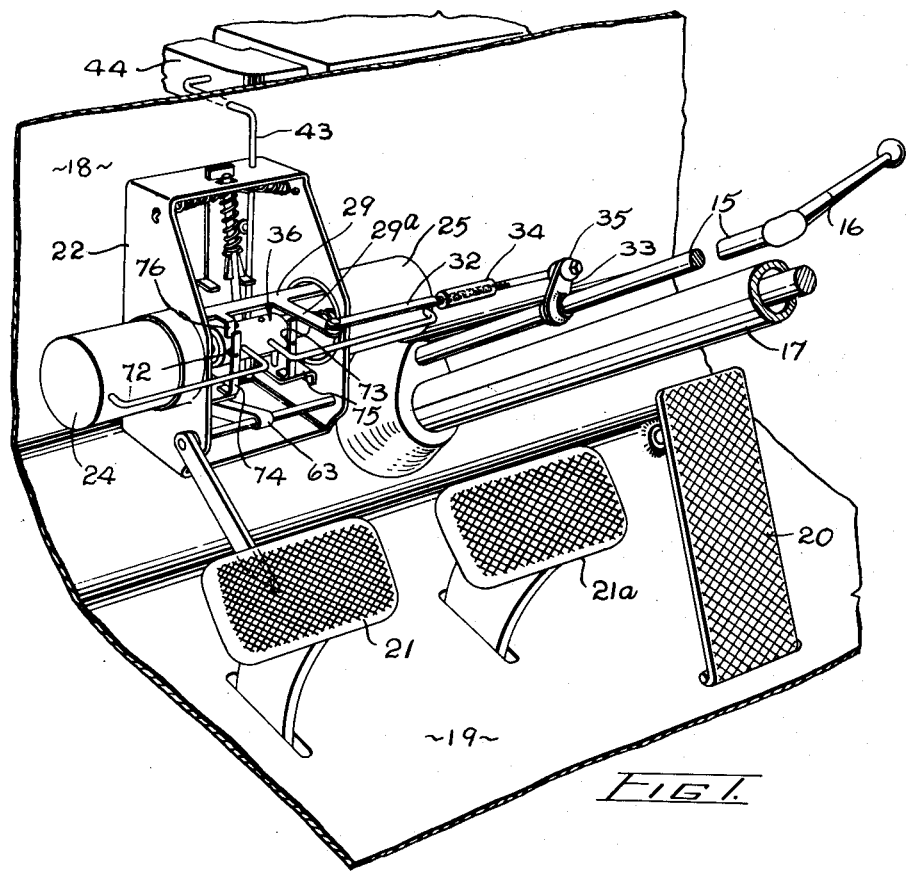

Referring to Figs. 1 and 4, a manual shift control rod 15 having a handle 16 at its upper end is shown associated with a steering column housing 17 which projects from the firewall 18 of the automotive vehicle. The manual shift control rod 15 is slidably mounted (not shown), and is adapted for both axial and rotary movement. As is conventional in the art, the axial movement of the shift control rod selects the transmission shift rail which is to be moved, and rotation of the shift control rod slides the selected shift rail in one of two directions (depending upon the direction of rod rotation); the combined axial and rotary movements effect the desired transmission speed ratio drive connection.

In most present day automotive vehicles having manually operated transmissions and shift control rods associated with the steering column housing, if the shift control rod is moved axially upwardly and is rotated in a counter-clockwise direction the transmission will be set in "reverse" whilst if the rod is moved in a clockwise direction the transmission will be set in "low"; if the rod is moved axially downwardly and is moved in a counter-clockwise direction the transmission will be set in "second" whilst if the rod is moved in a clock-wise direction the transmission will be set in "high." With such mechanisms, biasing means (not shown) conventionally are provided which normally urge the shift control rod axially downwardly, and thus if the operator rotates the shift rod without simultaneously applying to it an axial force, the biasing means will urge the shift rod axially downwardly so that the rotary motion applied by the operator will cause a shift of the transmission from second to high or vice versa.

Protruding above the floor 19 of the vehicle are the conventional accelerator pedal 20, clutch pedal 21 and brake pedal 21a. Depression of the clutch pedal 21 causes disengagement of the clutch (not shown), in a well known manner, the clutch returning to its normal engaged position when the clutch pedal is released.

The invention will be described as used with a conventional transmission and clutch of the types outlined above, but since the transmission and the clutch per se do not form part of the invention and are well known in the art, their descriptions will not be amplified.

Construction of pneumatic apparatus

Referring to Figs. 1–10, and more particularly to Figs. 1–4, a pneumatic apparatus constructed in accordance with the invention includes a casing 22 which may be mounted on the firewall 18 by nut and bolt assemblies 23. The casing supports a double-acting fluid pressure differential operated motor including a cylinder and a piston which is mounted for oscillatory movement (and more specifically, for reciprocation) in the cylinder and divides the cylinder into two chambers. In actual practice, it has been found preferable to use two separate cylinders 24 and 25 and two separate pistons 26 and 27, one for each cylinder, the said pistons being linked by a piston rod 28 and by a bar 29, and to interpose between the respective cylinder and piston assemblies the relay mechanism which controls the application of fluid pressure, but it will be appreciated that the apparatus illustrated in effect embodies a double-acting cylinder and piston assembly, the piston dividing the cylinder into two chambers 30 and 31.

The bar 29 through an extension arm 29a and a connecting rod 32 is linked to a crank 33 fast on the shift rod 15; a turnbuckle 34 is provided to vary the effective length of the connecting rod so as to permit appropriate installation adjustments. Since, as will be apparent from the drawings, the plane in which the connecting rod 32 reciprocates does not coincide with the plane in which the crank 33 rotates, the crank and the connecting rod are inter-connected by an appropriate flexible coupling 35.

The relay mechanism which controls the application of fluid pressure to the chambers 30 and 31 includes a selector generally indicated at 36. The selector comprises a plunger 37 which is mounted for axial sliding movement and also for angular sliding movement or rotation on the piston rod 28, and a sleeve 38 which is fixed to the casing 22 as by posts 39 and within which the plunger 37 is slidable. Similar compression springs 40 and 41 embrace the piston rod, and one end of each spring bears against an end of the plunger 37 while the other ends of the springs bear respectively against the back faces of the pistons 26 and 27. Since the springs are similar, it will be apparent that when the pistons move from one position to the other the springs urge the plunger 37 to a central position relative to the pistons 26 and 27.

In the sleeve 38 is provided a port 42 for connection by a tube 43 to a source of fluid pressure. The apparatus illustrated has been designed for use in connection with a source of sub-atmospheric pressure, and tube 43 conveniently is connected with the intake manifold of the automobile engine, schematically illustrated at 44 in Fig. 1. Two additional ports 45 and 46 are provided in the sleeve, and these are connected respectively by tubes 47 and 48 to ports provided in the cylinders 24 and 25. It is of course essential that the ports in the cylinders be located beyond the bounds of piston travel.

In the sleeve there are also provided vents 49 and 49a which are open to atmosphere and are adapted to be connected with cylinder 30, and vents 50 and 50a which likewise are open to atmosphere and are adapted to be connected with cylinder 31, as hereinafter will be described.

Figure 2:
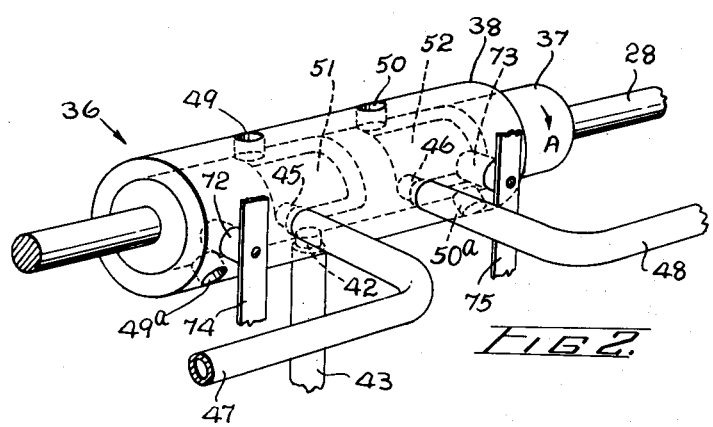
Fig. 2 is a perspective view to an enlarged scale of the selector of the relay mechanism of the apparatus illustrated in Fig. 1, and shown in corresponding position.

In the plunger 37 are machined two passages 51 and 52; when viewed from a line of sight normal to the axis of the plunger, each of these passages appears to be substantially rectangular; if a radial section is taken through a passage, it defines an annulus sector. It will be apparent from an examination of Fig. 2 that in the position illustrated atmospheric vent 49 is connected through passage 51 to port 45 and consequently to cylinder 30 through tube 47, whilst atmospheric vent 50 is connected through passage 52 to port 46 and consequently to cylinder 31 through tube 48. In Fig. 2 the selector is shown at the "inactive" condition, that is, it has connected both cylinders 30 and 31 to atmosphere and consequently the power piston is movable freely.

Figure 6:
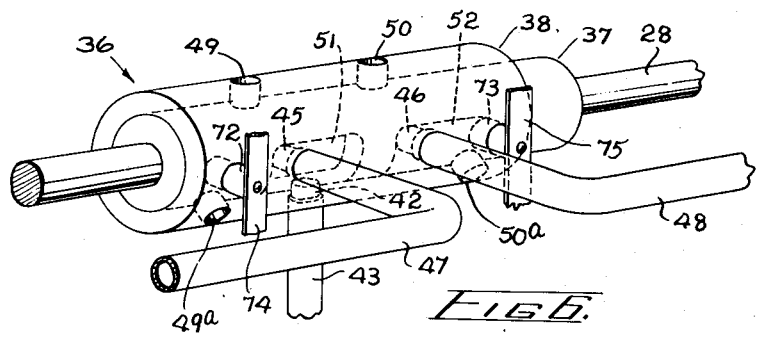
Fig. 6 is a perspective view to an enlarged scale of the selector, in the same position as illustrated in Fig. 5.

If the plunger 37 is rotated relative to the sleeve by approximately 90 degrees in the direction indicated by arrow A, to assume the position illustrated in Fig. 6, the vents 49 and 50 are blocked. However, cylinder 31 will remain connected to atmosphere through tube 48 because port 46 is connected through passage 52 to vent 50a; furthermore, cylinder 30 is connected to the source of fluid pressure through tube 43 because port 42 is connected to port 45 through passage 51.

It will be observed from the drawings that the plunger 37 is rotatable between two angular positions relative to the sleeve 38, and also is axially slidable between two positions. When the plunger is at an angular position such that both cylinders of the motor are connected to atmosphere (as in Figs. 2 and 10), the selector is at the "inactive" condition whilst if the plunger is at an angular position such that one cylinder is connected to atmosphere and the other is connected to the source of fluid pressure (as in Fig. 6), the selector is at the "active" condition. For convenience, the two positions to which the plunger may be moved axially relative to the sleeve are herein referred to as "settings" and thus when the plunger is in the axial position illustrated in Figs. 2 and 6 it is at the "first setting" whilst when it is in the position illustrated in Fig. 10 it is at the "second setting"; in Fig. 8 the plunger is in an instantaneous transitory position between the two settings. When the selector is in the inactive condition a change of setting has no effect on the motor piston. However, when the plunger is at the active condition and at the first setting the motor piston will be moved towards one position (towards the left, in the apparatus illustrated, to establish the transmission in "second") whilst if the selector is at the second setting the motor piston will be moved towards the other position (towards the right, in the apparatus illustrated, to establish the transmission in "high").

Secured to the plunger 37 of the selector and extending through an appropriate opening 53 provided in the sleeve 38 is a crank 54 to which is connected by a swivel joint 55 a connecting rod or lever 56. Lateral movement of the free end of the lever 56 is restrained by a collar 57 relative to which the lever is longitudinally movable, the collar being flexibly secured to the casing by helical springs 58 and 59. The lever 56 constantly is urged downwardly by a compression spring 60, one end of which bears against the collar 57 and the other end of which engages a pin 61 secured to the lever. Thus, the spring 60 in co-operation with the collar 57 and the springs 58 and 59 normally urges the crank 54 downwardly and hence urges the selector to the inactive condition.

Figure 7:
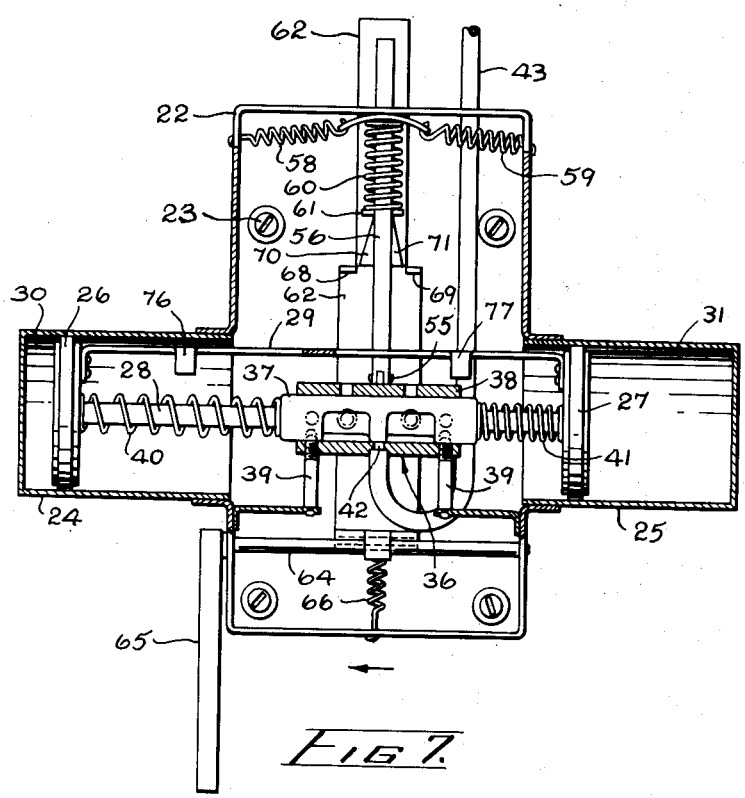
Fig. 7 is a vertical cross-sectional view similar to Fig. 5 but showing the selector of the relay mechanism in an instantaneous transitory position as its piston travels towards the left.
Figure 9:
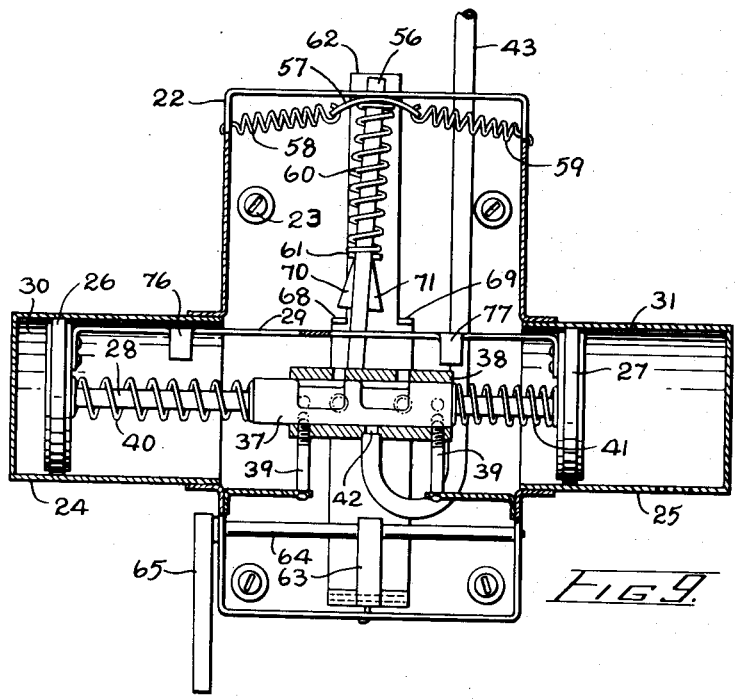
Fig. 9 is a vertical cross-sectional view similar to Figs. 5 and 7, but showing the relay mechanism in inactive condition after the selector piston has completed its travel towards the left.
Figure 10:
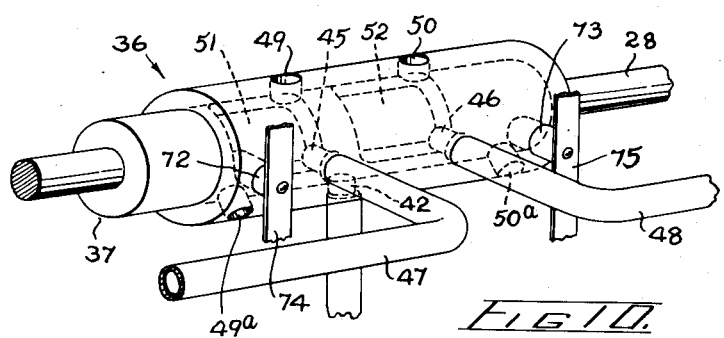
Fig. 10 is a perspective view to an enlarged scale of the selector, shown in the same position as in Fig. 9.

When the selector is at the first setting, that is when its plunger 37 is positioned to the right of a central position, as shown in Figs. 1, 2, 3, 5 and 6, the lever 56 is tilted in one direction due to the fact that its upper end is restrained against lateral movement while its lower end must follow the movement of the plunger 37; on the other hand, when the selector is at the second setting, as illustrated in Figs. 9 and 10 the lever 56 is tilted in the opposite direction. When the plunger 37 of the selector moves from one setting to the other, carrying with it the lower end of the lever 56, the lever swings like a pendulum about the collar 57 as its fulcrum, and of necessity it passes through an instantaneous position when it is positioned vertically, as illustrated in Fig. 7. The importance of this movement subsequently will be described.

In order to move the connecting rod upwardly and thus to condition the selector at the active condition, there is provided a reciprocatable arm 62 slidably mounted on the casing 22 at its upper end and the lower end of which is pivotally connected to one arm 63 of a bell crank lever pivotally mounted on the casing through a shaft 64. The free end of the other arm 65 of the bell crank lever is positioned to be engaged by the underneath face of the conventional clutch pedal 21 as the operator depresses the pedal to disengage the clutch.

A tension spring 66 connected at one end to the casing 22 and at its other end to a pin 67 of the arm 62 biases the arm downwardly. At each side of the arm 62 and spaced from each other are shoulders 68 and 69 which are adapted respectively to engage tapered lugs 70 or 71 provided at either side of the lever 56 when the arm 62 is translated upwardly by the operator's depression of the clutch pedal 21. Thus, when the operator depresses the clutch pedal the arm 62 moves upwardly so that shoulder 69 engages lug 71 (or shoulder 68 engages lug 70) and moves the lever 56 upwardly which in turn rotates the plunger 37 of the selector to condition the selector to the active condition.

As has been mentioned previously, the helical springs 40 and 41 constantly urge the plunger 37 of the selector to the first setting or to the second setting, depending on the position of the motor piston; if the motor piston is at the right hand position, as shown in Figs. 1 and 3, spring 40 forces the selector plunger to the first setting so that if and when the selector is conditioned to the active condition the fluid pressure causes the motor piston to move to the left hand position; if the motor piston is fully established at the left hand position, as shown in Fig. 9, spring 41 forces the selector plunger to the second setting so that if and when the selector is conditioned to the active condition the fluid pressure causes the motor piston to move to the right hand position. It is imperative that while the motor piston is changing position the selector setting remain unaltered, despite the urging of the compression springs 40 and 41, at least until after movement of the motor piston from a position to the alternative position has been assured; if means to delay the change in setting of the selector were not provided the plunger 37 would move simultaneously with the motor piston, and the motor piston would be unable to complete its movement from one position to the alternative position and would stop at a dead center position.

Consequently, there are provided bullet catches 72 and 73 which are supported adjacent the free ends of leaf springs 74 and 75, respectively, the other ends of the leaf springs being secured to the casing 22. The bullet catches are closely fitted in apertures provided in the sleeve 38 of the selector, and they are resiliently held therein by their respective leaf springs. The bullet catches are so located that when the selector is at the first setting (see Fig. 2) bullet catch 73 engages with the right hand wall which defines the passage 52 in the plunger 37 and it prevents movement of the plunger 37 to the second setting unless and until the bullet catch is withdrawn; when the selector is at the first setting, the bullet catch 72 is ineffective since it merely bears against the peripheral wall of the plunger 37. On the other hand, when the selector is at the second setting (see Fig. 10) the bullet catch 72 engages the left hand wall which defines the passage 51 in the plunger 37 and prevents movement of the plunger to the first setting unless and until the bullet catch is withdrawn; when the selector is at the second setting, the bullet catch 73 of course is ineffective. It should be stressed that although the bullet catches prevent a change in setting of the selector, they do not prevent angular movement or rotation of the plunger from one condition (active or inactive) to the alternative condition.

On the arm 29 which joins pistons 26 and 27 are provided fingers 76 and 77 which are adapted to lift respectively the free ends of the springs 74 and 75 to disengage the bullet catches from the selector plunger 37 at which stage the selector plunger will be moved to the first setting by compression spring 40. The finger 76 is so positioned that it disengages the bullet catch 72 from the plunger only when movement of the motor piston to the right hand position substantially has been completed. Similarly, the finger 77 is so positioned that it disengages the bullet catch 73 from the plunger piston 37 only after movement of the motor piston to the left hand position substantially has been completed, at which stage the selector plunger will be moved to the second setting by compression spring 41.

Thus, the bullet catch 73 provides means which holds the selector at the first setting when the motor piston is at the right hand position and while it moves towards the left hand position; the bullet catch 72 provides means which holds the selector at the second setting when the motor piston is at the left hand position and while it moves towards the right hand position. The compression springs 40 and 41 provide means urging the selector from the setting at which it is being held by a bullet catch to the alternative setting when the motor piston is changing position. The fingers 76 and 77 provide means responsive to position of the motor piston for releasing the bullet catches when the motor piston substantially has completed a change of position.

Assuming that the operator has depressed the clutch pedal 21 to an extent sufficient to condition the selector to the active condition, the motor piston will move to the alternative position from the position where it was situate when the relay mechanism was so conditioned. When movement of the motor piston substantially is completed, one of the fingers 76 or 77 will release the engaged bullet catch 72 or 73 and only then will the selector plunger 37 change from one setting to the other setting. As the plunger changes setting, it causes the lever 56 to swing about the collar 57 as a fulcrum and during this transition the lever will pass through a momentary vertical position, at which instant the lug 70 or 71 which was in engagement with a shoulder 68 or 69 will be free of the engaged shoulder and therefore the lever 56 forthwith will be forced downwardly by the compressed spring 60 thereby returning the selector to the inactive condition, irrespective of whether or not the operator has released the clutch pedal 21. Thus, means are provided to re-establish the selector in inactive condition after the motor piston has completed a change of position, and the motor piston cannot make another change of position unless the operator releases the clutch pedal and once again conditions the selector to the active condition.

*Operation of pneumatic mechanism*

In Figs. 1, 2, 3 and 4 the various parts of the apparatus are shown in the positions which they assume when the transmission has been set at "high" and the clutch is in engagement; in other words, the automotive vehicle is cruising in a normal fashion. The motor piston is at the right hand position. Since the clutch pedal 21 has not depressed arm 65 of the bell crank lever the arm 62 and the lever 56 are in their normal down position, so that the selector is at the inactive condition and consequently the cylinders 30 and 31 are connected to atmosphere. Furthermore, the selector is at the first setting and is held at that setting by bullet catch 73.

Figure 5:
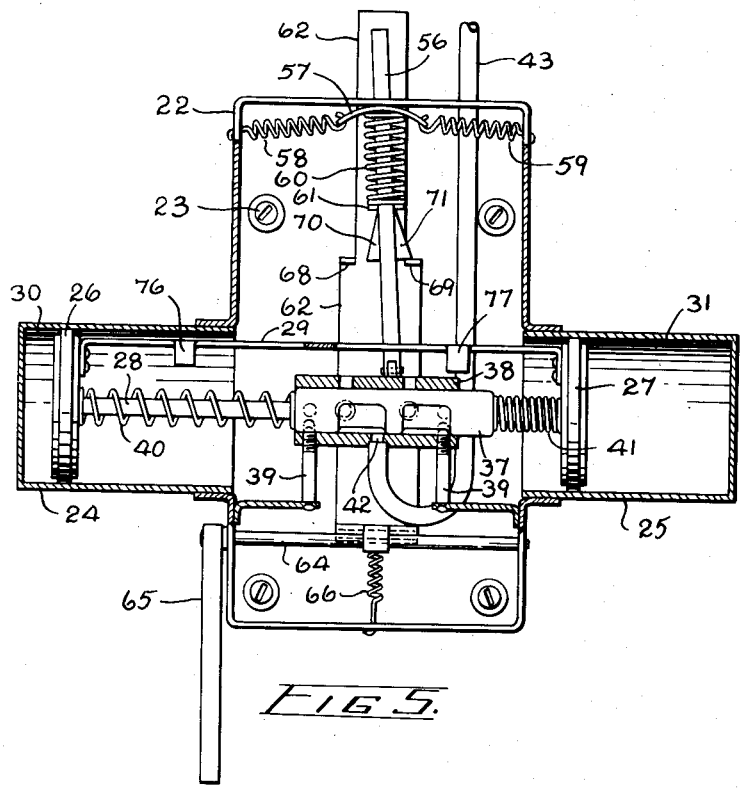
Fig. 5 is a vertical cross-sectional view similar to Fig. 3, but showing the power piston as it appears after it has moved to the left and consequently shifted the transmission to "second" because the relay mechanism has been set at the "active" condition by depression of the clutch pedal.

Figs. 5 and 6 illustrate the apparatus with the parts in the position which they assume immediately after the operator has depressed the clutch pedal. The arm 62 has been shifted upwardly and shoulder 69 thereof has engaged lug 71 of the lever 56, forcing the latter upwardly and compressing the spring 60. The upward movement of the lever has rotated the plunger 37 of the selector to the active condition, as better seen in Fig. 6. The selector being at the active condition and having been established at the first setting when the power piston previously had moved to the right hand position, cylinder 31 is connected to atmosphere whilst cylinder 30 is connected to the source of fluid pressure (vacuum); consequently the motor piston has moved towards the left and has established the transmission in "second." In Fig. 6, both bullet catches 72 and 73 are shown disengaged from the plunger 37, because in the position illustrated the motor piston has just completed its movement to the left hand position and finger 77 has caused disengagement of bullet catch 73; the plunger 37 is about to move to the second setting.

Figure 8:
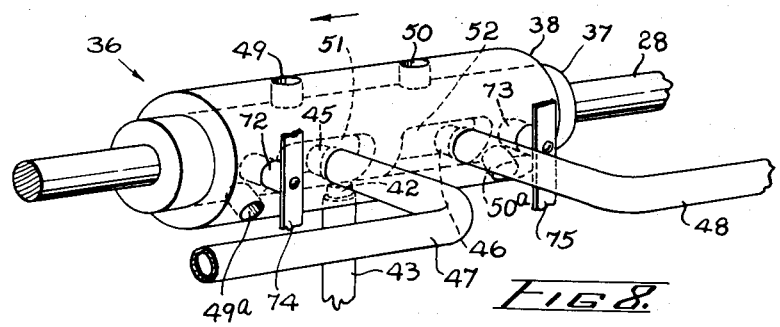
Fig. 8 is a perspective view to an enlarged scale of the selector, in the same position as illustrated in Fig. 7.

In Figs. 7 and 8 the parts of the apparatus are not in a stable position but are illustrated in an instantaneous transitory position which occurs after the bullet catch 73 has been disengaged from the selector plunger 37, with the result that the plunger is shifting from the first setting to the second setting. As the plunger moves towards the second setting it of course causes a swinging movement of the lever 56 about the collar 57, and when the plunger reaches the central position illustrated in Figs. 7 and 8 the lever assumes a vertical position so that both the two lugs 70 and 71 clear the shoulders 68 and 69; consequently the lever 56 is forced downwardly by the compression spring 60 to re-establish the selector at the inactive condition, as illustrated in Figs. 9 and 10.

In Figs. 9 and 10 the parts of the apparatus are shown in the position which they assume when the transmission has been shifted into second and the clutch pedal has been released. The selector plunger 37 has reached the second setting, and therefore the bullet catch 72 now is in engagement with it. It will of course be apparent that once the motor piston has completed its movement to establish the transmission in "second," the fact that the clutch pedal 21 may still be in depressed position is of no consequence in the positioning of the transmission.

After the clutch pedal is released, the apparatus remains at the inactive condition. If the clutch pedal once again is depressed, a cycle of operations which is the reverse to that just described will occur, thus shifting the transmission to high.

It is important to note that since when the selector is at the inactive condition both chambers 30 and 31 are connected to the atmosphere, and the operator is at all times able to shift the transmission manually. With a manual shift of the transmission, as with a power shift, the selector is held at the appropriate setting while the motor piston moves toward a new position and when it has reached the new position the selector then shifts to the alternative setting. Thus, the selector at all times is positioned at whatever setting will cause movement of the motor piston to the alternative position when the selector is conditioned to the active condition.

In present day automotive vehicles having manually operated transmissions and shift control rods associated with the steering column housing, the radial position of the shift control rod when the transmission is at "low" is identical to its radial position when the transmission is at "high." Therefore, if after the operator has manually set the transmission at "low" he subsequently depresses the clutch pedal the apparatus of the invention automatically will shift the transmission from "low" to "second"; the power piston causes the appropriate rotation of the shift control rod whilst the downward axial movement of the shift control rod is caused by the conventional biasing means which selects the transmission shift rail which is to be moved. If the clutch is depressed once again, the transmission will be shifted from "second" to "high" and if the clutch is depressed still another time the transmission will be shifted back to "second." At any time the transmission may be returned to neutral manually.

*Electrically operated apparatus with double-acting selector*

In Fig. 11 is illustrated schematically an electrically operated apparatus constructed in accordance with the invention and having a double-acting selector. In construction and in operation, this apparatus is the electrical equivalent of the aforedescribed pneumatic apparatus.

The electrical apparatus comprises an electrical power operated motor member 100 having a first energy convertor or solenoid 101 which when energized moves the motor member to one position and a second energy convertor or solenoid 102 which when energized moves the motor member to another position. The motor member is suitably arranged for connection to the shift rod of a conventional automotive vehicle transmission; for example, it might be connected to the shift rod 15 through the crank 33 and the connecting rod 32 of the automotive vehicle partly illustrated in Fig. 1.

The relay mechanism which controls the energization of the energy convertors 101 and 102 includes a selector or power operated element 103 movable between a first position and a second position and having a first solenoid 104 which when energized establishes the element in the first position and a second solenoid 105 which when energized establishes the element in the second position.

The solenoids 104 and 105 selectively are connected to an electrical supply 106 through a two-position switch 108 controlled by the motor member 100; when the motor member 100 is at one position the switch 108 connects the supply 106 to the solenoid 104 whilst when the motor member is at the other position the switch 108 connects the supply 106 to solenoid 105.

The energy convertors 101 and 102 selectively are connected to the electrical supply 106 through a two position switch 110 controlled by the element 103. When the element 103 is at the first position a connection is made by the switch 110 to the second energy convertor 102 whilst when the element 103 is at the second position a connection is made by the switch 110 to the first energy convertor 101. Thus the element 103 in effect provides a control for the switch 110 which selectively makes a power connection to one or to the other of the energy convertors 101 and 102. Furthermore the position of the element 103 (and hence of the switch 110) is controlled by coupling means between the motor member and the element; in the apparatus described the coupling means comprise the solenoids 104 and 105, which are selectively energized by the switch 108 controlled by the position of the motor member 100.

In series between the two position switch 110 and the electrical supply 106 is a normally open switch 111 which is closed when a solenoid 112 is energized and a normally open switch 113 which closes when the operator depresses a selecting arm 114.

Electrically insulated from but mechanically linked to the normally open switch 111 for opening and closing substantially in unison therewith is a second normally open switch 115. One side of the switch 115 is connected to the solenoid 112 while its other side is connected to the electrical supply 106 through a make-and-break switch 116 controlled by the element 103 and which is closed when the element is at either the first position or the second position and opens when the element moves from one position to the other. The solenoid 112 and the aforesaid one side of switch 115 also are connected in parallel to the electrical supply 106 through a normally closed switch 117 which opens when the operator depresses the selecting arm 114.

When the apparatus is installed for use with an automotive vehicle transmission, the selecting arm 114 is located so that it may be depressed as a consequence of the depression of the clutch pedal 21 of the vehicle. When the operator releases the clutch of the vehicle and hence releases the arm 114, the switch 117 closes and completes a circuit to the solenoid 112 thus closing the normally open switches 111 and 115. The closing of the switch 115 establishes a holding circuit to the solenoid 112 the said holding circuit being in parallel with the circuit through the switch 117, through the make-and-break switch 116 to the electrical supply 106; conequently, if the operator depresses the clutch thus opening the switch 117, the solenoid 112 will remain energized and the switch 111 will remain closed. Thus, there is provided a means which holds the switch 111 in closed condition after it is established in that condition. However, when the element 103 changes position, as hereinafter described, the holding means is disabled due to the fact that both circuits to the solenoid 112 simultaneously are broken: the switch 117 was opened by depression of the clutch, and opens the make-and-break switch due to the change in position of the element 103. Therefore, the switch 115 opens and de-energizes the solenoid 112, which remains deenergized until release of the clutch releases the arm 114 to close the switch 117.

When the operator depresses the clutch pedal 21, the switch 113 closes, thus completing a circuit from the electrical supply 106 to the first convertor 101 or to the second convertor 102, through the series-connected switch 111 and the element operated switch 110. As illustrated, the motor member 100 is at the right hand position and consequently the element 103 is at the second position; therefore, it is the first convertor 101 which will be energized, thus moving the motor member to the left hand position, and shifting the transmission to "second." When the motor member leaves the right hand position, the circuit through the switch 108 to the solenoid 105 will open; when the motor member arrives at the left hand position the circuit through the switch 108 to the solenoid 104 closes, thus moving the element 103 to the first position. As the element 103 changes position the make-and-break switch 116 momentarily opens thus opening the circuit to the solenoid 112 and completely de-energizing the apparatus because of the opening of the switches 111 and 115. Consequently, the motor member 100 will remain at its new position and will not return to its former position.

*Pneumo-electrically operated apparatus with double-acting selector*

The pneumo-electrical apparatus illustrated in Fig. 12 essentially is similar to the electrical apparatus of Fig. 11. However, in the pneumo-electrical apparatus the motor member which is adapted to be coupled to the shift rod of the transmission is not moved from one position to the other by the selective energization of solenoids, as in the apparatus of Fig. 11. Instead, the motor member 100a is moved from one position to the other by a fluid pressure operated piston 120 slidably mounted in a cylinder 121, one end of which selectively is connected to atmosphere or to a source of fluid pressure 122 by a valve 123 controlled by a solenoid 101a, and the other end of which selectively is connected to atmosphere or to the source of fluid pressure 122 by a valve 124 controlled by a solenoid 102a. Normally, the valves 123 and 124 connect both ends of the cylinder to atmosphere so that the motor member 100a freely is movable. When the solenoid 101a is energized, the port to atmosphere of the valve 123 will close and its port connected to the source of fluid pressure will open thus causing a shift of the motor member 100a to the alternative position, while if the solenoid 102a is energized the port to atmosphere of the valve 124 will close and its port connected to the source of fluid pressure will open thus causing a shift of the motor member to the position illustrated. The solenoids 101a and 102a of this apparatus are the functional equivalents of the first convertor 101 and of the second convertor 102, respectively, of the electrical apparatus of Fig. 11. The remaining components of the pneumo-electrical apparatus are identical to the components of the electrical apparatus of Fig. 11, and therefore their construction will be described only briefly.

The relay mechanism which controls the energization of the solenoids 101a and 102a includes a selector or power operated element 103a having a first solenoid 104a which when energized establishes the element in a first position, and a second solenoid 105a which when energized establishes the element in a second position. The solenoids 104a and 105a selectively are connected to an electrical supply 106a through a two position switch 108a controlled by the motor member 100a.

The solenoids 101a and 102a selectively are connected to the electrical supply 106a through a two-position switch 110a controlled by the element 103a.

In series between the two-position switch 110a and the electrical supply 106a is a normally open switch 111a which closes when a solenoid 112a is energized, and a normally open switch 113a which closes when the operator depresses a selecting arm 114a.

Electrically insulated from but mechanically linked with the normally open switch 111a for opening and closing substantially in unison therewith is a second normally open switch 115a. One side of the switch 115a is connected to the solenoid 112a while its other side is connected to the electrical supply 106a through a make-and-break switch 116a controlled by the element 103a and which is closed when the element is at either the first position or the second position and opens when the element moves from one position to the other. The solenoid 112a and the aforesaid one side of switch 115a also are connected in parallel to the electrical supply 106a through a normally closed switch 117a which opens when the operator depresses a selecting arm 114a. When the apparatus is installed for use with an automotive vehicle transmission, the arm 114a is located so that it may be depressed as a consequence of the depression of the clutch pedal 21 of the vehicle.

The operation of the pneumo-electrical apparatus is similar to that of the electrical apparatus of Fig. 11, with the exception that the energization of the solenoids 101a and 102a operates the valves 123 and 124 to move the motor member 100a from one position to the other, instead of moving the motor member directly by electromagnetic action.

*Electrically operated apparatus with single acting selector*

Figure 13:
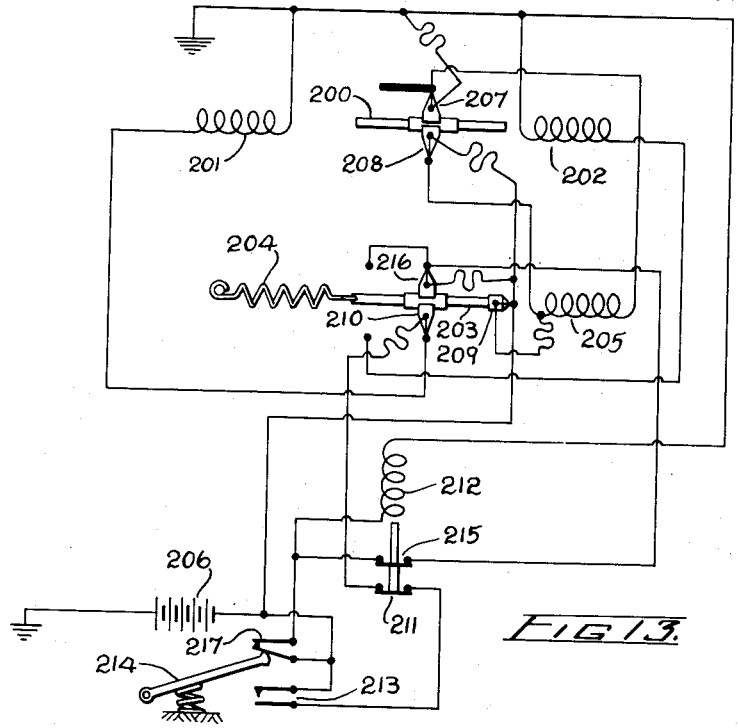
Fig. 13 is a schematic representation of another electrically operated embodiment of the invention, having a single acting selector.

In Fig. 13 is illustrated schematically another electrically operated apparatus constructed in accordance with the invention, but having a single-acting selector. This electrical apparatus comprises an electrical power operated motor member 200 having a first energy convertor or solenoid 201 which when energized moves the motor member to one position and a second energy convertor or solenoid 202 which when energized moves the motor member to another position. The motor member is suitably arranged for connection to the shift rod of a conventional automotive vehicle transmission; for example, it might be connected to the shift rod 15 through the crank 33 and the connecting rod 32 of the automotive vehicle partly illustrated in Fig. 1.

The relay mechanism which controls the energization of the energy convertors 201 and 202 includes a selector or power operated element 203 movable between a first position and a second position and having a biasing means 204 which normally establishes the element in the first position, and a solenoid 205 which when energized overcomes the biasing means and establishes the element in the second position.

One side of an electrical supply 206 is connected to a switch 207; the said switch is controlled by the motor member 200 to connect one side of the solenoid 205 to the said one side of the electrical supply when the motor member is at the position illustrated and when it is moving towards or away from the alternative position and to disconnect the said one side of the solenoid 205 from the electrical supply 206 when the motor member 200 is at the said alternative position. Two other switches 208 and 209 are connected in parallel to the other side of the solenoid 205. The switch 208 is controlled by the motor member 200 to connect the said other side of the solenoid 205 to the other side of the electrical supply 206 when the motor member 200 is at the illustrated position, and it is otherwise open; the switch 209 is controlled by the element 203 to connect the said other side of the solenoid 205 to the said other side of the electrical supply 206 when the element 203 is at the second position, and it is otherwise open.

The energy convertors 201 and 202 selectively are connected to the electrical supply 206 through a two-position switch 210 controlled by the element 203. When the element 203 is at the first position a connection is made by the switch 210 to the second energy convertor 202 whilst when the element 203 is at the second position a connection is made by the switch 210 to the first energy convertor 201.

In series between the two-position switch 210 and the electrical supply 206 is a normally open switch 211 which closes when a solenoid 212 is energized, and a normally open switch 213 which closes when the operator depresses a selecting arm 214.

Electrically insulated from but mechanically linked with the normally open switch 211 for opening and closing substantially in unison therewith is a second normally open switch 215. One side of the switch 215 is connected to the solenoid 212 while its other side is connected to the source of electrical energy 206 through a make-and-break switch 216 controlled by the element 203 and which is closed when the element is at either the first position or the second position and opens when the element moves from one position to the other. The solenoid 212 and the aforesaid one side of switch 215 also are connected in parallel to the electrical supply 206 through a normally closed switch 217 which opens when the operator depresses the selecting arm 214.

When the apparatus is installed for use with an automotive vehicle transmission the selecting arm 214 is located so that it may be depressed as a consequence of the depression of the clutch pedal 21 of the vehicle. When the operator releases the clutch of the vehicle and hence releases the arm 214, the switch 217 closes and completes a circuit to the solenoid 212 thus closing the normally open switches 211 and 215. The closing of the switch 215 establishes a holding circuit to the solenoid 212 in parallel with the circuit through the switch 217, the said holding circuit being through the make-and-break switch 216 to the electrical supply 206; consequently, if the operator depresses the clutch thus opening the switch 217, the solenoid 212 will remain energized and the switch 211 will remain closed. Thus, there is provided a means which holds the switch 211 in closed condition after it is established in that condition. However, when the element 203 changes position, as hereafter described, the holding means is disabled due to the fact that both circuits to the solenoid 212 simultaneously are broken; the switch 217 was opened by depression of the clutch, and the make-and-break switch 216 opens due to the change of position of the element 203. Therefore, the switch 215 opens and de-energizes the solenoid 212 which remains de-energized until release of the clutch releases the arm 214 to close the switch 217.

When the operator depresses the clutch pedal 21, the switch 213 closes, thus completing a circuit from the electrical supply 206 to the first convertor 201 or to the second convertor 202, through the series-connected closed switch 211 and the element operated switch 210. As illustrated, the motor member 200 is at the right hand position, and consequently the element 203 is at the second position; therefore, it is the first convertor 201 which will be energized, thus moving the motor member to the left hand position and shifting the transmission to "second". When the motor member 200 leaves the right hand position, the switch 208 by which one side of the solenoid 205 is connected to one side of the electrical supply 206 will open, but that will not be of any consequence since the said one side of the solenoid 205 remains connected to the said one side of the electrical supply 206 through the switch 209. When the motor member arrives at the left hand position the connection through the switch 207 of the other side of the solenoid 205 to the other side of the electrical supply 206 will open thus de-energizing the solenoid 205, and consequently the biasing means 204 will move the element 203 to the first position.

When the motor member 200 leaves the left hand position (because of a subsequent depression of the clutch) a connection of the said other side of the electrical supply 206 to the said other side of the solenoid 205 immediately is made through the switch 207; however, that is of no consequence since the switches 208 and 209 connecting the said one side of the solenoid 205 to the said one side of the electrical supply both are open. However, when the motor member arrives at the right hand position, the switch 208 connecting the said one side of the solenoid 205 to the said one side of the electrical supply 206 will close, thus energizing the solenoid 205 and moving the element 203 back to the second position.

As the element 203 changes position, the make-and-break switch 216 momentarily opens, thus opening the circuit to the solenoid 212 and de-energizing the apparatus because of the opening of the switches 211 and 215. Consequently, the motor member 200 will remain at its new position and will not return to its former position.

*Pneumo-electrically operated apparatus with single-acting selector*

Figure 14:
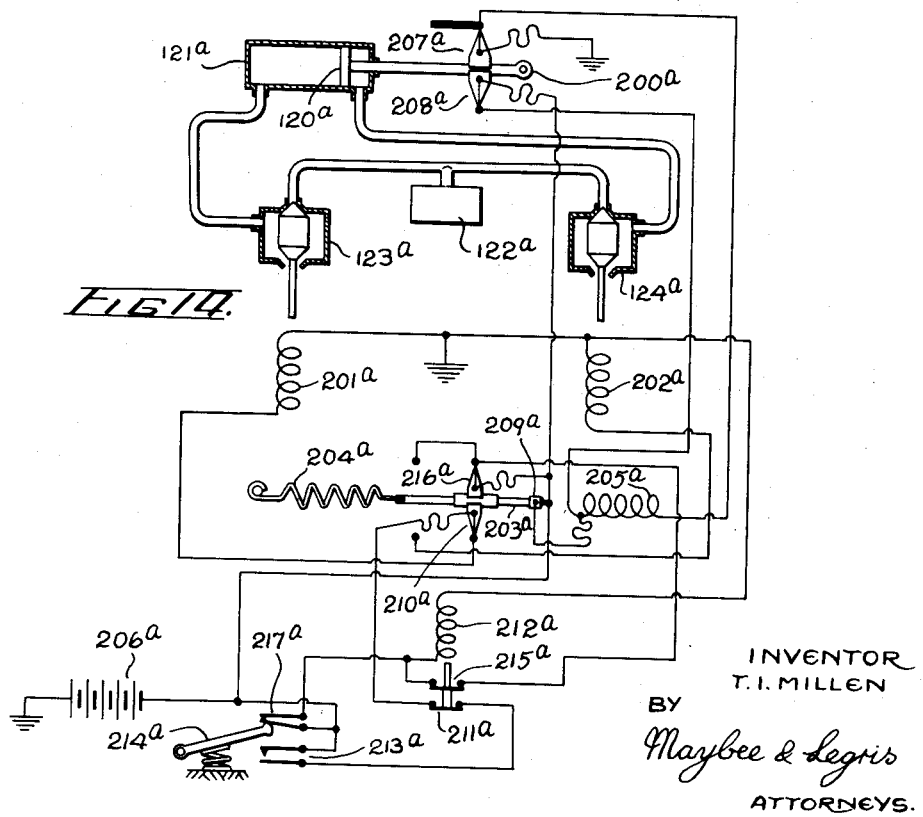
Fig. 14 is a schematic illustration of a pneumo-electrical embodiment of the invention, having a single acting selector, the electrical components of which are based on the apparatus of Fig. 13.

The pneumo-electrical apparatus illustrated in Fig. 14 essentially is similar to the electrical apparatus of Fig. 13. The relationship between these two apparatuses is identical to that between the pneumo-electrical apparatus of Fig. 12 and the electrical apparatus of Fig. 11.

A motor member 200a which is adapted to be coupled to the shift rod of the transmission is moved from one position to the other by a fluid pressure operated piston 120a slidably mounted in a cylinder 121a, one end of which selectively is connected to atmosphere or to a source of fluid pressure 122a by a valve 123a controlled by a solenoid 201a, and the other end of which selectively is connected to atmosphere or to the source of fluid pressure 122a by a valve 124a controlled by a solenoid 202a. Normally, the valves 123a and 124a connect both ends of the cylinder to atmosphere so that the motor member 201a freely is movable. When the solenoid 201a is energized, the port to atmosphere of the valve 123a will close and its port connected to the source of fluid pressure will open thus causing a shift of the motor member 200a to the alternative position, while if the solenoid 202a is energized the port to atmosphere of the valve 124a will close and its port connected to the source of fluid pressure will open thus causing a shift of the motor member to the position illustrated. The solenoids 201a and 202a of this apparatus are the functional equivalents of the first convertor 201 and of the second convertor 202, respectively, of the electrical apparatus of Fig. 13. The remaining components of the pneumo-electrical apparatus are identical to the components of the electrical apparatus of Fig. 13, and therefore their construction will be described only briefly.

The relay mechanism which controls the energization of the solenoids 201a and 202a includes a selector or power operated element 203a having a biasing means 204a which normally establishes the element in a first position and a solenoid 205a which when energized overcomes the biasing means and establishes the element in a second position.

One side of an electrical supply 206a is connected to a switch 207a; the said switch is controlled by the motor member 200a to connect one side of the solenoid 205a to the said one side of the electrical supply when the motor member is at the position illustrated and when it is moving towards or away from the alternative position and to disconnect the said one side of the solenoid 205a from the electrical supply 206a when the motor member 200a is at the said alternative position. Two other switches 208a and 209a are connected in parallel to the other side of the solenoid 205a. The switch 208a is controlled by the motor member 200a to connect the said other side of the solenoid 205a to the other side of the electrical supply 206a when the motor member 200a is at the illustrated position, and it is otherwise open; the switch 209a is controlled by the element 203a to connect the said other side of the solenoid 205a to the said other side of the electrical supply 206a when the element 203a is at the second position, and it is otherwise open.

The solenoids 201a and 202a selectively are connected to the electrical supply 206a through a two-position switch 210a controlled by the element 203a.

In series between the two-position switch 210a and the electrical supply 206a is a normally open switch 211 which closes when a solenoid 212a is energized, and a normally open switch 213a which closes when the opertaor depresses a selecting arm 214a.

Electrically insulated from but mechanically linked with the normally open switch 211a for opening and closing substantially in unison therewith is a second normally open switch 215a. One side of the switch 215a is connected to the solenoid 212a while its other side is connected to the electrical supply 206a through a make-and-break switch 216a controlled by the element 203a and which is closed when the element is at either the first position or the second position and opens when the element moves from one position to the other. The solenoid 212a and the aforesaid one side of the switch 215a also are connected in parallel to the electrical supply 206a through a normally closed switch 217a which opens when the operator depresses the selecting arm 214a. When the apparatus is installed for use with an automotive vehicle transmission, the arm 214a is located so that it may be depressed as a consequence of the depression of the clutch pedal 21 of the vehicle.

The operation of the pneumo-electrical apparatus of Fig. 14 is similar to that of the electrical apparatus of Fig. 13, with the exception that the energization of the solenoids 201a and 202a operates the valves 123a and 124a to move the motor member 200a from one position to the other, instead of moving the motor member directly by electromagnetic action.

It should be stressed that in the several embodiments of the invention, the motor member at all times may be moved manually (by manually moving the shift control rod 15, if the invention is incorporated in an automotive vehicle). If the motor member is so moved, the selector or relay mechanism invariably is moved to the correct position or setting so that if the device is activated the motor member will move to the "alternative" position.

It is to be understood that the forms of the invention herewith shown and described, are to be taken as preferred examples of the same, and that various changes in the shape, size and arrangement of the parts may be restorted to without departing from the spirit of the invention or the scope of the subjoined claims.

What I claim as my invention is:

1. An apparatus comprising a power operated motor member which when activated oscillates between two positions, a relay mechanism for the transmission of power to the motor member and conditionable to an active condition where it effects the activation of the motor member and to an inactive condition at which the motor member is freely movable, operator actuated means conditioning the relay mechanism to the active condition causing movement of the motor member from one position to the other, the relay mechanism including means responsive to the position of the motor member to establish movement of the motor member toward one position if the motor member is at the other position when the relay mechanism is conditioned to the active condition and to establish movement of the motor member towards the said other position if the motor member is at the said one position when the motor member is conditioned to the active condition, and means conditioning the relay mechanism to the inactive condition when movement of the motor member from a position to the alternative position has been assured.

2. An apparatus comprising a power operated motor member which when activated oscillates between two positions, a relay mechanism for the transmission of power to the motor member and conditionable to an active condition where it effects the activation of the motor member and to an inactive condition at which the motor member is freely movable, operator actuated means conditioning the relay mechanism to the active condition causing movement of the motor member from one position to the other, the relay mechanism including means responsive to the position of the motor member to establish movement of the motor member toward one position if the motor member is at the other position when the relay mechanism is conditioned to the active condition and to establish movement of the motor member towards the said other position if the motor member is at the said one position when the motor member is conditioned to the active condition, and means, actuated by the motor member when its transition has been assured to the alternative position from the position where it was situate when the relay mechanism was conditioned to active condition, to re-establish the relay mechanism in the inactive condition.

3. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to cause the activation of the motor member towards one position, and the selector at the second setting being effective when the relay mechanism is at the active condition to cause the activation of the motor member towards the other position and also including means responsive to position of the motor member to establish the selector at the first setting substantially when the motor member arrives at the said other position and to establish the selector at the second setting substantially when the motor member arrives at the said one position, operator actuated means conditioning the relay mechanism to the active condition, and means to re-establish the relay mechanism in inactive condition after the motor member has completed a change of position.

4. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to cause the activation of the motor member towards one position, and the selector at the second setting being effective when the relay mechanism is at the active condition to cause the activation of the motor member towards the other position and also including means responsive to position of the motor member to establish the selector at the first setting substantially when the motor member arrives at the said other position and to establish the selector at the second setting substantially when the motor member arrives at the said one position, operator actuated means conditioning the relay mechanism to the active condition, and means, actuated by the motor member as a result of its movement to the alternative position from the position where it was situate when the relay mechanism was conditioned to the active condition, to re-establish the relay mechanism in inactive condition after the motor member has completed a change of position.

5. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to cause the activation of the motor member towards one position, and the selector at the second setting being effective when the relay mechanism is at the active condition to cause the activation of the motor member towards the other position and also including means responsive to position of the motor member to establish the selector at the first setting substantially when the motor member arrives at the said other position and to establish the selector at the second setting substantially when the motor member arrives at the said one position, operator actuated means conditioning the relay mechanism to the active condition, and means co-operating with the selector to re-establish the relay mechanism in inactive condition when a change of position of the motor member is effected.

6. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to establish the activation of the motor member towards one position, and the selector at the second setting being effective when the relay mechanism is at the active condition to establish the activation of the motor member towards the other position, and also including means responsive to position of the motor member to establish the selector at the first setting substantially when the motor member arrives at the said other position and to establish the selector at the second setting substantially when the motor member arrives at the said one position, operator actuated means conditioning the relay mechanism to the active condition, and means actuated by the motor member to re-establish the relay mechanism in inactive condition after the motor member has completed a change of position.

7. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to establish the activation of the motor member towards one position, and the selector at the second setting being effective when the relay mechanism is at the active condition to establish the activation of the motor member towards the other position, means holding the selector at the first setting when the motor member is at the said other position and while it moves towards the said one position and holding the selector at the second setting when the motor member is at the said one position and while it moves towards the said other position, means urging the selector from the setting at which it is being held by the holding means to the alternative setting when the motor member is changing position, means responsive to position of the motor member for releasing the holding means when the motor member substantially has completed a change in position, operator actuated means conditioning the relay mechanism to the active condition, and means actuated by the motor member to re-establish the relay mechanism in inactive condition after the motor member has completed a change of position.

8. An apparatus for effecting a controlled oscillatory movement of a device between two positions, comprising a power operated motor member for coupling to the device and which when activated moves from one position to the other, a relay mechanism for the transmission of power to the motor member and conditionable to an active condition where it effects the activation of the motor member and to an inactive condition at which the motor member is freely movable, the relay mechanism including a selector having a first and a second setting, the selector at the first setting being effective when the relay mechanism is at the active condition to establish the activation of the motor member towards one position, and the selector at the second setting being effective when the relay mechanism is at the active condition to establish the activation of the motor member towards the other position, means establishing the selector at the first setting when the motor member is at the said other position and establishing the selector at the second setting when the motor member is at the said one position, means holding the selector at the established setting when the motor member moves from a position to the alternative position, operator actuated means conditioning the relay mechanism to the active condition, and means actuated by the motor member to reestablish the relay mechanism in inactive condition after the motor member has completed a change of position.

9. An apparatus for effecting a controlled oscillatory movement of a device between two positions, comprising a power operated motor member for coupling to the device and including a first energy convertor which when activated establishes the motor member at one position and a second energy convertor which when activated establishes the motor member at the other position, an element movable between a first and a second position, coupling means between the motor member and the element, the said coupling means establishing the element in the first position when the motor member is at the said one position and in the second position when the motor member is at the said other position, a switch controlled by the element and selectively conditionable to a first energy convertor activating condition when the element is at the second position and to a second energy convertor activating condition when the element is at the first position, a circuit breaker in series with the switch, means holding the circuit breaker in closed condition after it is established in that condition, disabling means controlled by the element to release the circuit breaker holding means when the element moves from one position to the other, a source of electrical energy, a normally open switch in series with the circuit breaker and which when closed connects with the source of electrical energy, and operator actuated means which when actuated closes the normally open switch and which when released establishes the circuit breaker in closed condition.

10. An apparatus for effecting a controlled oscillatory movement of a device between two positions, comprising a power operated motor member for coupling to the device and including a first energy convertor which when activated establishes the motor member at one position and a second energy convertor which when activated establishes the motor member at the other position, an element movable between a first and a second position, coupling means between the motor member and the element, the said coupling means establishing the element in the first position when the motor member is at the said one position and in the second position when the motor member is at the said other position, a switch controlled by the element and selectively conditionable to a first energy convertor activating condition when the element is at the second position and to a second energy convertor activating condition when the element is at the first position, a first normally open switch in series with the element controlled switch, a solenoid operated mechanism which closes the said normally open switch when the solenoid is energized, a second normally open switch electrically insulated from but linked to the first normally open switch for opening and closing substantially in unison therewith, a source of electrical energy, an operator actuated selecting switch mechanism connected to the source of energy, the said selecting switch mechanism being conditionable at the will of the operator to a first circuit making position which connects the source of electrical energy in series with the first normally open switch, and the said selecting switch mechanism when released establishing itself at an alternative circuit making position which connects the source of electrical energy to the solenoid to close the first and the second normally open switches, and an element controlled make-and-break switch in series with the second normally open switch and which is closed when the element it at either position and opens when the element moves from one position to the other, the solenoid also being connected to the source of electrical energy through the serially connected make-and-break switch and second normally open switch when both said switches are closed so that the solenoid remains energized therethrough when the selecting switch mechanism is conditioned to the first circuit making position, the make-and-break switch de-energizing the solenoid if when the element changes position the selecting switch mechanism is at the first circuit making position.

11. An apparatus for effecting a controlled oscillatory movement of a device between two positions, comprising a power operated motor member for coupling to the device and including a first energy convertor which when activated establishes the motor member at one position and a second energy convertor which when activated establishes the motor member at the other position, a source of electrical energy for connection to the energy convertors, a power operated element including a first solenoid which when energized establishes the element at a first position and a second solenoid which when energized establishes the element at a second position, the source of electrical energy including a source for connection to the solenoids, a switch connected to the solenoid source of electrical energy and controlled by the motor member for selective connection to the first solenoid when the motor member is at the said one position and to the second solenoid when the motor member is at the said other position, a switch controlled by the element for selective connection to the first energy convertor when the element is at the second position and to the second energy convertor when the element is at the first position, a circuit breaker in series with the element controlled switch, means holding the circuit breaker in closed condition after it is established in that condition, disabling means controlled by the element to release the circuit breaker holding means when the element moves from one position to the other, a normally open switch in series with the circuit breaker and which when closed connects with the energy convertor source of electrical energy, and operator actuated means which when actuated closes the normally open switch and which when released establishes the circuit breaker in closed condition.

12. An apparatus for effecting a controlled oscillatory movement of a device between two positions, comprising a power operated motor member for coupling to the device and including a first energy convertor which when activated establishes the motor member at one position and a second energy convertor which when activated establishes the motor member at another position, a source of electrical energy for connection to the energy convertors, a power operated element including a first solenoid which when energized establishes the element in a first position and a second solenoid which when energized establishes the element in a second position, the source of electrical energy encluding a source for connection to the solenoids, a switch connected to the solenoid source of energy and controlled by the motor member for selective connection to the first solenoid when the motor member is at the said one position and to the second solenoid when the motor member is at the said other position, a switch controlled by the element for selective connection to the first energy convertor when the element is at the second position and to the second energy convertor when the element is at the first position, a first normally open switch in series connection with the element controlled switch, a solenoid operated mechanism which closes the said normally open switch when its solenoid is energized, a second normally open switch electrically insulated from but linked to the first normally open switch for opening and closing substantially in unison therewith, an operator actuated selecting switch mechanism connected to the energy convertor source of electrical energy, the said selecting switch mechanism being conditionable at the will of the operator to a first circuit making position which connects the said source of electrical energy in series with the first normally open switch, and the said switch mechanism when released establishing itself at an alternative circuit making position which connects the said source of electrical energy to the solenoid of the solenoid operated mechanism to close the first and the second normally open switches, and an element controlled make-and-break switch in series with the second normally open switch and which is closed when the element is at either position and opens when the element moves from one position to the other, the solenoid of the solenoid operated mechanism also being connected to the energy convertor source of electrical energy through the serially connected make-and-break switch and second normally open switch when both said switches are closed so that the said solenoid remains energized therethrough when the selecting switch mechanism is conditioned to the first circuit making position, the make-and-break switch de-energizing the said solenoid if when the element changes position the selecting switch mechanism is at the first circuit making position.

13. An apparatus for effecting a controlled oscillatory movement of a device between two positions, comprising a power operated motor member for coupling to the device and including a first energy convertor which when activated establishes the motor member at one position and a second energy convertor which when activated establishes the motor member at the other position, a source of electrical energy for connection to the energy convertors, a power operated element movable between a first and a second position, a solenoid which when energized establishes the element in the first position, biasing means establishing the element in the second position when the solenoid is not energized, the source of electrical energy including a source for connection to the element solenoid, a switch connected to one side of the element solenoid source of energy and controlled by the motor member to connect one side of the element solenoid to the said one side of the element solenoid source of energy when the motor member is at the said one position and when it is moving towards or away from the said other position and to disconnect the said one side of the element solenoid from the element solenoid source of energy when the motor member is at the said other position, two switches connected in parallel to the other side of the element solenoid, one of the said two switches being controlled by the motor member to connect the said other side of the element solenoid to the said other side of the element solenoid source of energy when the motor member is at the said one position and being otherwise open, the other of the said two switches being controlled by the element to connect the said other side of the element solenoid to the said other side of the element solenoid source of energy when the element is at the said first position and being otherwise open, a second switch controlled by the element for selective connection to the first energy convertor when the element is at the second position and to the second energy convertor when the element is at the first position, a circuit breaker in series with the second element controlled switch, means holding the circuit breaker in closed condition after it is established in that condition, disabling means controlled by the element to release the circuit breaker holding means when the element moves from one position to the other, a normally open switch in series with the circuit breaker and which when closed connects with the enregy convertor source of electrical energy, and operator actuated means which when actuated closes the normally open switch and which when released establishes the circuit breaker in closed condition.

14. An apparatus for effecting a controlled oscillatory movement of a device between two positions, comprising a power operated motor member for coupling to the device and including a first energy convertor which when activated establishes the motor member at one position and a second energy convertor which when activated establishes the motor member at the other position, a source of electrical energy for connection to the energy convertors, a power operated element movable between a first and a second position, a solenoid which when energized establishes the element in the first position, biasing means establishing the element in the second position when the solenoid is not energized, the source of electrical energy including a source for connection to the element solenoid, a switch connected to one side of the element solenoid source of electrical energy and controlled by the motor member to connect one side of the element solenoid to the said one side of the element solenoid source of energy when the motor member is at the said one position and when it is moving towards or away from the said other position and to disconnect the said one side of the element solenoid from the element solenoid source of energy when the motor member is at the said other position, two switches connected in parallel to the other side of the element solenoid, one of the said two switches being controlled by the motor member to connect the said other side of the element solenoid to the other side of the element solenoid source of energy when the motor member is at the said one position and being otherwise open, the other of the said two switches being controlled by the element to connect the said other side of the element solenoid to the said other side of the element solenoid source of energy when the element is at the said first position and being otherwise open, a second switch controlled by the element for selective connection to the first energy convertor when the element is at the second position and to the second energy convertor when the element is at the first position, a first normally open switch in series connection with the second element controlled switch, a solenoid operated mechanism which closes the said first normally open switch when its solenoid is energized, a second normally open switch electrically insulated from but linked to the first normally open switch for opening and closing susbtantially in unison therewith, an operator actuated selecting switch mechanism connected to the energy convertor source of electrical energy, the said selecting switch mechanism being conditionable at the will of the operator to a first circuit making position which connects the said source of electrical energy in series with the first normally open switch and the said switch mechanism when released establishing itself at an alternative circuit making position which connects the said source of electrical energy to the solenoid of the solenoid operated mechanism to close the first and the second normally open switches, and an element controlled make-and-break switch in series with the second normally open switch and which is closed when the element is at either position and opens when the element moves from one position to the other, the solenoid of the solenoid operated mechanism also being connected to the energy convertor source of electrical energy through the serially connected make-and-break switch and second normally open switch when both said switches are closed so that the said solenoid remains energized therethrough when the selecting switch mechanism is conditioned to the first circuit making position, the make-and-break switch de-energizing the said solenoid if when the element changes position the selector switch mechanism is at the first circuit making position.

15. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mechanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, an element movable between a first and a second position, coupling means between the piston and the element, the said coupling means establishing the element in the first position when the piston is at the said one position and in the second position when the piston is at the said other position, a switch controlled by the element for selective connection to the first electromagnetic valve when the element is at the second position and to the second electromagnetic valve when the element is at the first position, a circuit breaker in series with the switch, means holding the circuit breaker in closed condition after it is established in that condition, disabling means controlled by the element to release the circuit breaker holding means when the element moves from one position to the other, a normally open switch in series with the circuit breaker and which when closed connects with the source of electrical energy, and operator actuated means which when actuated closes the normally open switch and which when released establishes the circuit breaker in closed condition.

16. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mechanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, an element movable between a first and a second position, coupling means between the piston and the element, the said coupling means establishing the element in the first position when the piston is at the said one position and in the second position when the piston is at the said other position, a switch controlled by the element for selective connection to the first electromagnetic valve when the element is at the second position and to the second electromagnetic valve when the element is at the first position, a first normally open switch in series connection with the element controlled switch, a solenoid operated mechanism which closes the said normally open switch when its solenoid is energized, a second normally open switch electrically insulated from but linked to the first normally open switch for opening and closing substantially in unison therewith, an operator actuated selecting switch mechanism connected to the source of electrical energy, the said selecting switch mechanism being conditionable at the will of the operator to a first circuit making position which connects the source of electrical energy in series with the first normally open switch and the said switch mechanism when released establishing itself at an alternative circuit making position which connects the source of electrical energy to the solenoid of the solenoid operated mechanism to close the first and the second normally open switches, and an element controlled make-and-break switch in series with the second normally open switch and which is closed when the element is at either position and opens when the element moves from one position to the other, the solenoid of the solenoid operated mechanism also being connected to the source of electrical energy through the serially connected make-and-break switch and second normally open switch when both said switches are closed so that the said solenoid remains energized therethrough when the selecting switch mechanism is conditioned to the first circuit making position, the make-and-break switch de-energizing the said solenoid if when the element changes position the selecting switch mechanism is at the first circuit making position.

17. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mechanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, a power operated element including a first solenoid which when energized establishes the element at a first position and a second solenoid which when energized establishes the element at a second position, the source of electrical energy including a source for connection to the solenoids, a switch connected to the solenoid source of energy and controlled by the piston for selective connection to the first solenoid when the piston is at the said one position and to the second solenoid when the piston is at the said other position, a switch controlled by the element for selective connection to the first electromagnetic valve when the element is at the second position and to the second electromagnetic valve when the element is at the first position, a circuit breaker in series with the element controlled switch, means holding the circuit breaker in closed condition after it is established in that condition, disabling means controlled by the element to release the circuit breaker holding means when the element moves from one position to the other, a normally open switch in series with the circuit breaker and which when closed connects with the electromagnetic valve source of electrical energy, and operator actuated means which when actuated closes the normally open switch and which when released establishes the circuit breaker in closed condition.

18. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mehcanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, a power operated element including a first solenoid which when energized establishes the element in a first position and a second solenoid which when energized establishes the element in a second position, the source of electrical energy including a source for connection to the solenoids, a switch connected to the solenoid source of energy and controlled by the piston for selective connection to the first solenoid when the piston is at the said one position and to the second solenoid when the piston is at the said other position, a switch controlled by the element for selective connection to the first electromagnetic valve when the element is at the second position and to the second electromagnetic valve when the element is at the first position, a first normally open switch in series connection with the element controlled switch, a solenoid operated mechanism which closes the said normally open switch when its solenoid is energized, a second normally open switch electrically insulated from but linked to the first normally open switch for opening and closing substantially in unison therewith, an operator actuated selecting switch mechanism connected to the electromagnetic valve source of electrical energy, the said selecting switch mechanism being conditionable at the will of the operator to a first circuit making position which connects the said source of electrical energy in series with the first normally open switch and the said switch mechanism when released establishing itself at an alternative circuit making position which connects the said source of electrical energy to the solenoid of the solenoid operated mechanism to close the first and the second normally open switches, and an element controlled make-and-break switch in series with the second normally open switch and which is closed when the element is at either position and opens when the element moves from one position to the other, the solenoid of the solenoid operated mechanism also being connected to the electromagnetic valve source of electrical energy through the serially connected make-and break switch and second normally open swtch when both said switches are closed so that the said solenoid remains energized therethrough when the selecting switch mechanism is conditioned to the first circuit making position, the make-and-break switch de-energizing the said solenoid if when the element changes position the selecting switch mechanism is at the first circuit making position.

19. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mechanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, a power operated element movable between a first and a second position, a solenoid which when energized establishes the element in the first position, biasing means establishing the element in the second position when the solenoid is not energized, the source of electrical energy including a source for connection to the element solenoid, a switch connected to one side of the element solenoid source of electrical energy and controlled by the piston to connect one side of the element solenoid to the said one side of the element solenoid source of energy when the piston is at the said one position and when it is moving towards or away from the said other position and to disconnect the said one side of the element solenoid from the element solenoid source of energy when the piston is at the said other position, two switches connected in parallel to the other side of the element solenoid, one of the said two switches being controlled by the piston to connect the said other side of the element solenoid to the said other side of the element solenoid source of energy when the piston is at the said one position and being otherwise open, the other of the said two switches being controlled by the element to connect the said other side of the element solenoid to the said other side of the element solenoid source of energy when the element is at the said first position and being otherwise open, a second switch controlled by the element for selective connection to the first electromagnetic valve when the element is at the second position and to the second electromagnetic valve when the element is at the first position, a circuit breaker in series with the second element controlled switch, means holding the circuit breaker in closed condition after it is established in that condition, disabling means controlled by the element to release the circuit breaker holding means when the element moves from one position to the other, a normally open switch in series with the circuit breaker and which when closed connects with the electromagnetic valve source of electrical energy, and operator actuated means which when actuated closes the normally open switch and which when released establishes the circuit breaker in closed condition.

20. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a source of fluid pressure, a valve mechanism to control the application of fluid pressure to the chambers and including a first electromagnetic valve which when energized connects the source of fluid pressure to one chamber to establish the piston at one position and a second electromagnetic valve which when energized connects the source of fluid pressure to the other chamber to establish the piston at the other position, a source of electrical energy for connection to the electromagnetic valves, a power operated element movable between a first and a second position, a solenoid which when energized establishes the element in the first position, biasing means establishing the element in the second position when the solenoid is not energized, the source of electrical energy including a source for connection to the element solenoid, a switch connected to one side of the element solenoid source of electrical energy and controlled by the piston to connect one side of the element solenoid to the said one side of the element solenoid source of energy when the piston is at the said one position and when it is moving towards or away from the said other position and to disconnect the said one side of the element solenoid from the element solenoid source of energy when the piston is at the said other position, two switches connected in parallel to the other side of the element solenoid, one of the said two switches being controlled by the piston to connect the said other side of the element solenoid to the said other side of the element source of energy when the piston is at the said one position and being otherwise open, the other of the said two switches being controlled by the element to connect the said other side of the element solenoid to the said other side of the element solenoid source of energy when the element is at the said first position and being otherwise open, a second switch controlled by the element for selective connection to the first electromagnetic valve when the element is at the second position and to the second electromagnetic valve when the element is at the first position, a first normally open switch in series connection with the second element controlled switch, a solenoid operated mechanism which closes the said first normally open switch when its solenoid is energized, a second normally open switch electrically insulated from but linked to the first normally open switch for opening and closing substantially in unison therewith, an operator actuated selecting switch mechanism connected to the electromagnetic valve source of electrical energy, the said selecting switch mechanism being conditionable at the will of the operator to a first circuit making position which connects the said source of electrical energy in series with the first normally open switch and the said switch mechanism when released establishing itself at an alternative circuit making position which connects the said source of electrical energy to the solenoid of the solenoid operated mechanism to close the first and the second normally open switches, and an element controlled make-and-break switch in series with the second normally open switch and which is closed when the element is at either position and opens when the element moves from one position to the other, the solenoid of the solenoid operated mechanism also being connected to the electromagnetic valve source of electrical energy through the serially connected make-and-break switch and second normally open switch when both said switches are closed so that the said solenoid remains energized therethrough when the selecting switch mechanism is conditioned to the first circuit making position, the make-and-break switch de-energizing the said solenoid if when the element changes position the selecting switch mechanism is at the first circuit making position.

21. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activation of the motor piston towards one position, the selector when at the active condition and at the second setting effecting the activation of the motor member towards the other position, means responsive to position of the motor piston to establish the selector at the first setting substantially when the motor piston arrives at the said other position and to establish the selector at the second setting substantially when the motor piston arrives at the said one position, operator actuated means conditioning the selector to the active condition to cause movement of the motor piston from a position to the alternative position, and means conditioning the selector to the inactive condition when movement of the motor piston from a position to the alternative position has been assured.

22. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activation of the motor piston towards one position, the selector when at the active condition and at the second setting effecting the activation of the motor member towards the other position, means responsive to position of the motor piston to establish the selector at the first setting substantially when the motor piston arrives at the said other position and to establish the selector at the second setting substantially when the motor piston arrives at the said one position, operator actuated means conditioning the selector to the active condition to cause movement of the motor piston from a position to the alternative position, and means, actuated by the motor piston when its transition has been assured to the alternative position from the position where it was situate when the selector was conditioned to active condition, to re-establish the selector at the inactive condition.

23. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activation of the motor piston towards one position, the selector when at the active condition and at the second setting effecting the activation of the motor member towards the other position, means responsive to position of the motor piston to establish the selector at the first setting substantially when the motor piston arrives at the said other position and to establish the selector at the second setting substantially when the motor piston arrives at the said one position, operator actuated means conditioning the selector to the active condition to cause movement of the motor piston from a position to the alternative position, and means to re-establish the selector in inactive condition after the motor piston has completed a change of position.

24. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activation of the motor piston towards one position, the selector when at the active condition and at the second setting effecting the activation of the motor member towards the other position, means responsive to position of the motor piston to establish the selector at the first setting substantially when the motor piston arrives at the said other position and to establish the selector at the second setting substantially when the motor piston arrives at the said one position, operator actuated means conditioning the selector to the active condition to cause movement of the motor piston from a position to the alternative position, and means, actuated by the motor piston as a result of its movement to the alternative position from the position where it was situate when the selector was conditioned to the active condition, to re-establish the selector in inactive condition after the motor member substantially has completed a change of position.

25. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and a piston arranged for longitudinal sliding movement relative to each other to a first selector setting and to a second selector setting and for angular sliding movement relative to each other to a first selector condition and to a second selector condition, the selector when conditioned at the inactive condition enabling the motor piston to be freely movable, the selector when at the active condition and at the first setting effecting the activation of the motor piston towards one position, the selector when at the active condition and at the second setting effecting the activation of the motor member towards the other position, means holding the selector at the first setting when the motor piston is at the said other position and while it moves towards the said one position and holding the selector at the second setting when the motor position is at the said one position and while it moves toward the said other position, means urging the selector from the setting at which it is being held by the holding means to the alternative setting when the motor piston is changing position, means responsive to position of the motor piston for releasing the holding means when the motor piston substantially has completed a change in position, operator actuated means conditioning the selector to the active condition to cause movement of the motor piston from a position to the alternative position, and means conditioning the selector to the inactive condition when movement of the motor piston from a position to the alternative position has been assured.

26. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activation of the motor piston towards one position, the selector when at the active condition and at the second setting effecting the activation of the motor member towards the other position, means responsive to position of the motor piston to establish the selector at the second setting substantially when the motor piston arrives at the said one position and to establish the selector at the first setting substantially when the motor piston arrives at the said other position, a lever connected to the selector to rotate the sleeve and piston relative to each other to active condition and to inactive condition, means normally biasing the lever to rotate the selector to inactive condition, operator actuated means releasably engageable with the lever to rotate the selector to active condition, and co-operating means of the lever and of the operator actuated means to disengage the operator actuated means from the lever when the selector moves from one setting to the other, the biasing means returning the selector to inactive condition when the lever is disengaged from the operator actuated means.

27. An apparatus for effecting a controlled oscillatory movement of a device between two positions comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and piston arranged for longitudinal sliding movement relative to each other to a first selector setting and to a second selector setting and for angular sliding movement relative to each other to a first selector condition and to a second selector condition, the selector when at the inactive condition enabling the motor piston to be freely movable, the selector when at the active condition and at the first setting effecting the activating of the motor piston towards one position, the selector when at the active condition and at the second setting effecting the activation of the motor member towards the other position, means responsive to position of the motor piston to establish the selector at the second setting substantially when the motor piston arrives at the said one position and to establish the selector at the first setting substantially when the motor piston arrives at the said other position, a lever connected to the selector to rotate the sleeve and piston relative to each other to active condition and to inactive condition, means normally biasing the lever to rotate the selector to inactive condition, operator actuated means normally urged to one position and shiftable to a second position at the will of the operator, a coupling of the lever and of the operator actuated means which engages when the operator actuated means is shifted to the second position to rotate the selector to active condition, the coupling including means to disengage the previously engaged operator actuated means and lever when the selector moves from one setting to the other, the biasing means returning the selector to inactive condition when the lever and the operator actuated means are disengaged.

28. An apparatus for effecting a controlled oscillatory movement of a device between two positions, comprising a fluid pressure operated motor including a cylinder and a piston for coupling to the device and which is mounted for oscillatory movement in the cylinder and divides the cylinder into two chambers, the piston moving from one position to the other when fluid pressure selectively is applied to the chambers, a relay mechanism to control the application of fluid pressure to the chambers and including a selector having a sleeve and a piston arranged for longitudinal sliding movement relative to each other to a first selector setting and to a second selector setting and for angular sliding movement relative to each other to a first selector condition and to a second selector condition, the selector when conditioned at the inactive condition enabling the motor piston to be freely movable, the selector when at the active condition and at the first setting effecting the activation of the motor piston towards one position, the selector when at the active condition and at the second setting effecting the activation of the motor member towards the other position, means holding the selector at the first setting when the motor piston is at the said other position and while it moves towards the said one position and holding the selector at the second setting when the motor piston is at the said one position and while it moves toward the said other position, means urging the selector from the setting at which it is being held by the holding means to the alternative setting when the motor piston is changing position, means responsive to position of the motor piston for releasing the holding means when the motor piston substantially has completed a change in position, a lever connected to the selector to rotate the sleeve and piston relative to each other to active condition and to inactive condition, means normally biasing the lever to rotate the selector to inactive condition, operator actuated means releasably engageable with the lever to rotate the selector to active condition, and co-operating means of the lever and of the operator actuated means to disengage the operator actuated means from the lever when the selector moves from one setting to the other, the biasing means returning the selector to inactive condition when the lever and the operator actuated means are disengaged.

29. An apparatus for effecting a controlled oscillatory movement of a device between two positions, comprising a double-acting fluid pressure operated motor including a cylinder, a piston for coupling to the device and which is mounted for oscillatory movement in the cylinder and divides the cylinder into two chambers, the piston moving from one position to the other when fluid pressure selectively is applied to the chambers, there being a first opening in the cylinder beyond the bounds of piston travel in one direction to provide a port for one chamber and a second opening in the cylinder beyond the bounds of piston travel in the other direction to provide a port for the other chamber, a relay mechanism to control the application of fluid pressure to the chambers including a selector having a sleeve and a piston arranged for longitudinal sliding movement relative to each other to a first selector setting and to a second selector setting and for angular sliding movement relative to each other to a first selector condition and to a second selector condition, a port in the sleeve for connection to a source of fluid pressure, two other ports in the sleeve connected respectively to the cylinder ports, vents in the sleeve communicating with atmosphere, two pressure transmitting passages in the selector piston, the said passages connecting a vent to one sleeve port and another vent to the other sleeve port when the sleeve and the selector piston are angularly disposed at the inactive condition and irrespective of their setting, one passage connecting the fluid pressure port to one of the said other sleeve ports and the other passage connecting a vent to the other of the said other sleeve ports when the selector is at the active condition and at the first setting to move the motor piston towards one position, the said other passage connecting the fluid pressure port to the said other of the said other sleeve ports and the said one passage connecting a vent to the said one of the said other sleeve ports when the selector is at the active condition and at the second setting to move the motor piston towards the other position, means responsive to position of the motor piston to establish the selector at the second setting substantially when the motor piston arrives at the said one position and to establish the selector at the first setting substantially when the motor piston arrives at the said other position, operator actuated means conditioning the selector to the active condition to cause movement of the motor piston from a position to the alternative position, and means conditioning the selector to the inactive condition when movement of the motor piston from a position to the alternative position has been assured.

30. An apparatus for effecting a controlled oscillatory movement of a device between two positions, comprising a double-acting fluid pressure differential operated motor including a cylinder, a piston for coupling to the device and which is mounted for oscillatory movement in the cylinder and divides the cylinder into two chambers, the piston moving from one position to the other when fluid pressure selectively is applied to the chambers, there being a first opening in the cylinder beyond the bounds of piston travel in one direction to provide a port for one chamber and a second opening in the cylinder beyond the bounds of piston travel in the other direction to provide a port for the other chamber, a relay mechanism to control the application of fluid pressure to the chambers including a selector having a sleeve and a piston arranged for longitudinal sliding movement relative to each other to a first selector setting and to a second selector setting and for angular sliding movement relative to each other to a first selector condition and to a second selector condition, a port in the sleeve for connection to a source of fluid pressure, two other ports in the sleeve connected respectively to the cylinder ports, vents in the sleeve communicating with atmosphere, two pressure transmitting passages in the selector piston, the said passages connecting a vent to one sleeve port and another vent to the other sleeve port when the sleeve and the selector piston are angularly disposed at the inactive condition and irrespective of their setting, one passage connecting the fluid pressure port to one of the said other sleeve ports and the other passage connecting a vent to the other of the said other sleeve ports when the selector is at the active condition and at the first setting to move the motor piston towards one position, the said other passage connecting the fluid pressure port to the said other of the said other sleeve ports and the said one passage connecting a vent to the said one of the said other sleeve ports when the selector is at the active condition and at the second setting to move the motor piston towards the other position, means responsive to position of the motor piston to establish the selector at the second setting substantially when the motor piston arrives at the said one position and to establish the selector at the first setting substantially when the motor piston arrives at the said other position, a lever connected to the selector to rotate the sleeve and piston relative to each other to active condition and to inactive condition, means normally biasing the lever to rotate the selector to inactive condition, operator actuated means releasably engageable with the lever to rotate the selector to active condition, and co-operating means of the lever and of the operator actuated means to disengage the operator actuated means from the lever when the selector moves from one setting to the other, the biasing means returning the selector to inactive condition when the lever is disengaged from the operator actuated means.

References Cited in the file of this patent

UNITED STATES PATENTS

| | | |
|---|---|---|
| 2,126,032 | Randol | Aug. 9, 1938 |
| 2,623,402 | Koch | Dec. 30, 1952 |
| 2,649,813 | Barth et al. | Aug. 25, 1953 |